June 11, 1940.　　　　C. E. MAIN ET AL　　　　2,203,995
STROBOSCOPIC DISTANT INDICATOR
Filed Nov. 2, 1936　　　5 Sheets-Sheet 1

Charles E. Main and
Leonard Hanson
INVENTORS

BY Alfred R. Fuchs
ATTORNEY

June 11, 1940.    C. E. MAIN ET AL    2,203,995
STROBOSCOPIC DISTANT INDICATOR
Filed Nov. 2, 1936    5 Sheets-Sheet 2
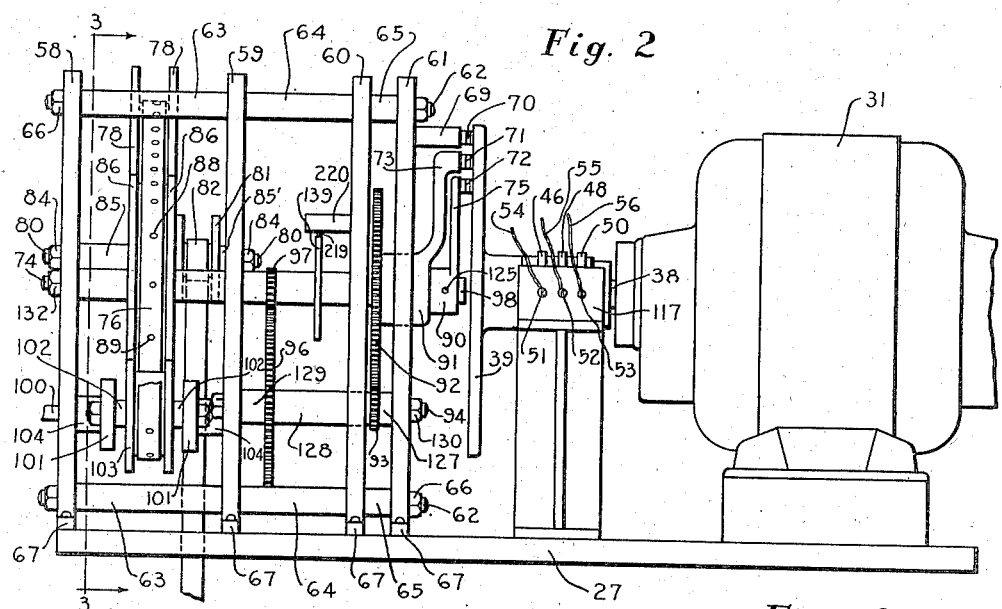
Charles E. Main and
Leonard Hanson
INVENTORS
BY Alfred R. Fuchs
ATTORNEY June 11, 1940.                C. E. MAIN ET AL                2,203,995
                    STROBOSCOPIC DISTANT INDICATOR
                        Filed Nov. 2, 1936              5 Sheets-Sheet 3

Charles E. Main and
Leonard Hanson
INVENTORS

BY *Alfred R. Fuchs*
ATTORNEY

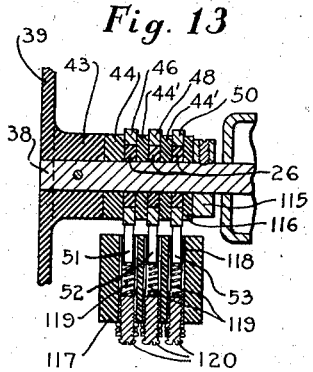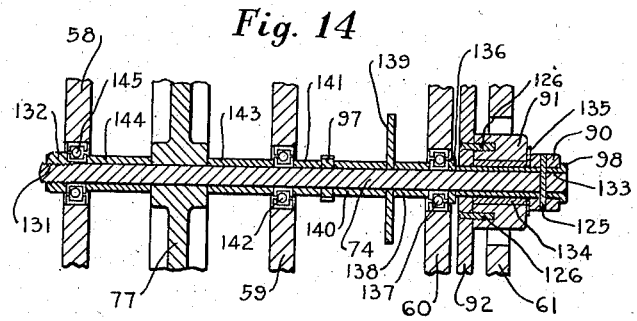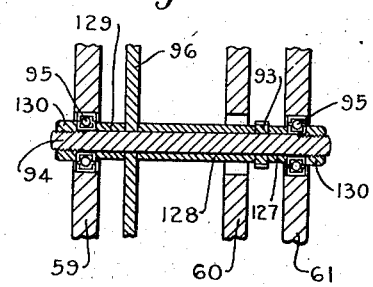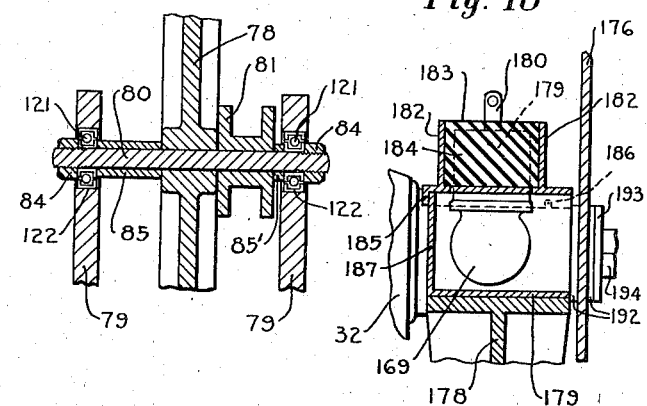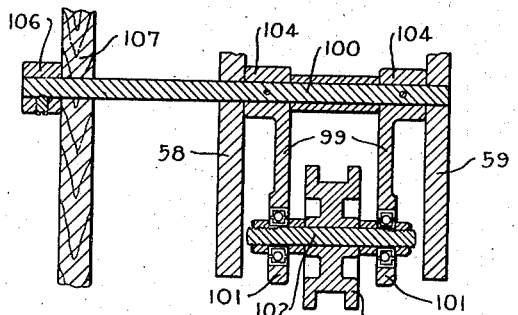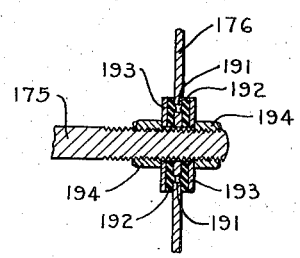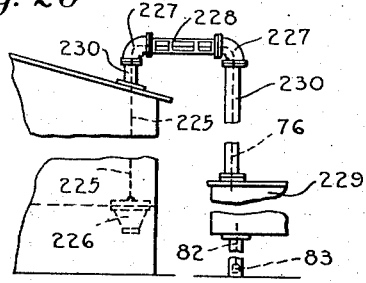

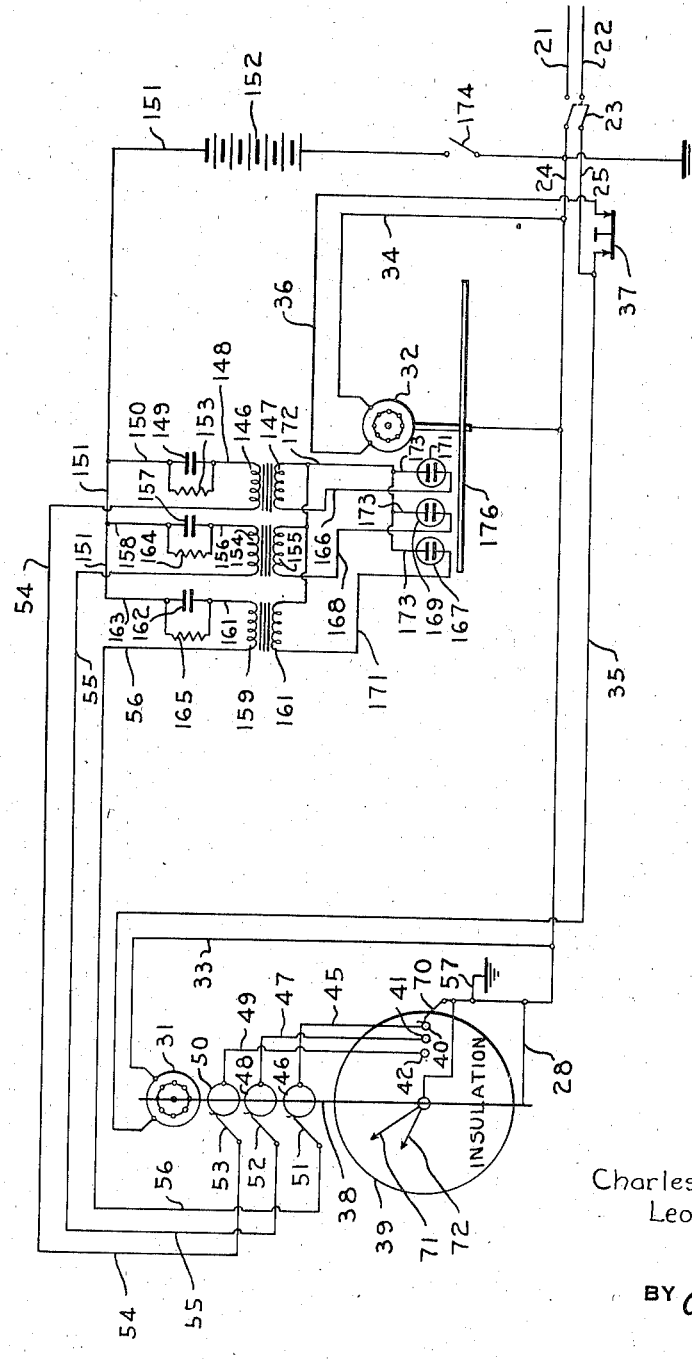

Patented June 11, 1940

2,203,995

UNITED STATES PATENT OFFICE 2,203,995

STROBOSCOPIC DISTANT INDICATOR

Charles E. Main, Kansas City, and Leonard Hanson, Carrollton, Mo.; said Hanson assignor to said Main Application November 2, 1936, Serial No. 108,776

11 Claims. (Cl. 177—351)

Our invention relates to indicating instruments, and more particularly to an instrument for indicating a reading, or measurement, at a distance from the point at which the same is being taken, wherein the principle of a stroboscope is utilized to transfer the reading from the point at which it is taken to the point at which it is indicated.

More particularly our invention comprises a sending station, or stations, and a receiving station, the measurement to be made being made at the sending station and transmitted by electrical stroboscopic means to indicating means at the receiving station, the sending station being constructed and arranged to affect electric transmission circuits extending between the receiving and sending stations in accordance with the position of certain sending members, the position of which is dependent upon the position of parts that are taking a measurement, which is to be transmitted to the receiving station, said receiving station being provided with flash illuminating means energized at intervals, dependent upon the position of the sending means, to cause an indication to appear on a rotatable indicating member, the indication on the rotating indicating member being apparently stationary due to the fact that the sending means comprises a rotatable member rotating at the same speed as the indicating member, producing a stroboscopic effect on the rotating indicating member by means of said flash illuminating means, each of which is flashed once during each rotation of the sending member in accordance with the angular position of the sending members cooperating therewith, whose position is determined by the measuring apparatus forming part of the means located at the sending station. In the particular embodiment of the invention shown in the drawings, the sending means is utilized for transmitting the measurement of the depth of liquid in a tank and the mechanical means provided is for the purpose of translating the position of a float located on the liquid to a scale indicating the position of said float from the bottom of said tank in feet and inches. The stroboscopic apparatus is, however, so constructed that it can be utilized to indicate any position of any movable object from any predetermined starting point, or the relative angular position of any two members to each other, such, for example, as the position of a draw bridge, of an indicator hand, of a canal lock gate, or anything of that character, the particular operating means for moving the sending members to various angular positions being variable to provide an angular position, or angular positions, for said members in accordance with the position of a part, or parts, the location of which it is desired to measure and indicate at the indicating means.

Generally considered, our improved apparatus comprises sending means, which is mechanically connected with a movable member, such as a float in a tank, to move in accordance with the position of said movable member into various angular positions about an axis, which axis is the axis of rotation of a rotatable sending member cooperating with said angularly positioned sending members to transmit impulses over electrical circuits, each of which is provided with a flash illuminating member, such as a Neon lamp, for illuminating a limited portion of an indicating member, which indicating member is also rotatable, said rotatable indicating member and the rotatable sending member being provided with means for rotating the same at substantially, or approximately, the same speed, there being stationary indicating means, such as a cross line, or hair line, provided as an index for determining the reading of the indicating means, which is located so as to be illuminated by said flash illuminating means adjacent the rotating indicator. While the ideal condition is that the two rotatable members, that is, the one at the sending station and the one at the receiving station, rotate at exactly the same speed and are also in exact synchronism with each other, means is provided whereby a reading of sufficient accuracy for all practical purposes is obtainable with our apparatus without having said rotatable members constantly in exact synchronism with each other and without having the same operating at exactly the same speed of rotation at all times.

In order to obtain a uniform speed of rotation that is substantially the same for both the rotatable indicating member and the rotatable sending means, it is preferred that alternating current synchronous induction motors be utilized for rotating said two rotatable members, which are located at points distant from each other, which motors are operated by an alterating current of the same characteristics and with the alternations thereof in synchronism with each other, and which motors are, preferably, made of identical construction, that is, with the same number of poles provided on the stator thereof, and with the poles of the same size and same arcuate spacing from each other in both motors. By providing such matched motors, the speed of rotation of the two rotatable members will be so nearly the same at all times that any slight variations in the speed of rotation thereof that may be due to outside influences, such as temperature, will not affect the relative speed of rotation of the two rotatable members sufficiently that the variation in speed between said rotatable members cannot be compensated for by means that is provided for the purpose of synchronizing the coincidences of the means for indicating a starting point, or zero reading, with the sending of impulses, causing the flashing of the flash illuminating means associated with this indicating means, said impulses being produced due to the cooperation of a fixed member at the sending station for determining the zero point of the measuring means at said station and cooperating means on the rotatable member located at said sending station once during each rotation of said rotatable member at the sending station.

It is an important purpose of our invention to provide means for producing the synchronization of the indicating means and the sending means as referred to above, this being accomplished by mechanical means and electrical means. In a pair of induction motors that are substantial duplicates, having a plurality of pairs of poles, it is uncertain, even when starting said motors by means of a single switch closing the circuits of both motors, that said motors will start with corresponding portions of the rotors of the two motors adjacent corresponding poles of the stators of the two motors. Accordingly the two motors might be operating at the same speed, and while the speed of the motors may be synchronized, the rotation of the rotors would not be synchronized exactly, that is, a given point on the one rotor will not be at the exact point in its path of rotation at which the corresponding point on the other rotor is located at the same instant. The same may be spaced from each other a fraction of a complete rotation, this fraction being dependent upon the number of pairs of poles with which the stator is provided.

Electrical means is provided for shifting the relationship of the poles of the stator to the rotor by providing means for instantaneously breaking and remaking the circuit operating the one motor without interrupting the flow of current to the other motor, this being accomplished, preferably, by means of a switch which is manually opened and mechanically reclosed by snap action, such a switch being commonly known as a "jog" switch. Thus by jogging the one motor relative to the other the poles can be brought into correspondence so that the two motors are rotating in exact synchronism, that is, with the corresponding parts of the rotating portions of both motors in exactly the same position at any instant. This means for bringing the motors into such exact synchronism is one of the means for bringing about synchronism of the zero reading sending means at the sending station, and the zero reading indicating means at the receiving station.

It is also an important purpose of our invention to provide means for mechanically adjusting the rotating means associated with the motor located at the receiving station to adjust the dial forming part of said rotatable means at the receiving station so that the indication thereon representing a starting point, or zero reading, will be brought into alignment with a cross hair, or marker, or index, that is stationary, at the exact instant when the flash occurs that is produced by the sending means of the zero, or starting point, indication. This adjustment is accomplished by mechanically rotating the stator of the motor that rotates said rotatable indicating means while the stator is rotating at a constant speed, to gradually shift the poles of the stator in the proper direction to align the zero indication on the rotating indicator with the stationary indicator, such as a hair line, located in a fixed position adjacent said rotatable indicating means. Ordinarily, if the two motors, one at the sending station and the one at the receiving station, are rotating at the same speed, this last mentioned adjustment is only necessary once, at the time that the apparatus is installed, or might be necessary in case it is accidentally brought out of adjustment by movement of the adjusting means out of its adjusted position. However, this last mentioned adjusting means may also be utilized to obtain a reading of the indicator scale that is approximately correct within the limitations required for all practical purposes, should there be a slight variance in the speed of rotation of the rotatable sending member and the rotatable indicator, or dial, at the receiving station. The exact zero point at a given instant can thus be obtained by manipulation of this adjusting means, even though the rotatable means at the sending and receiving stations are not rotating at exactly the same speed, and an absolutely correct reading of the scale associated with said zero indicating means can be obtained at the same time, provided the difference in the speed of rotation of the two rotatable members is not too great. Also by the provision of the last mentioned adjusting means, it is possible to use the same receiver with any one of a large number of different sending stations, or transmitting stations. Thus reading of the liquid level in a plurality of different tanks can be taken successively by throwing the receiving station into circuit with the respective sending stations at said tanks, and if a slight variation in the zero point occurs due to the differences in the adjustment, or mounting, of the sending means at the different stations, this can be adjusted for by manipulating the last mentioned adjusting means to adjust the position of the stator of the receiving station motor to bring the zero indication on the rotatable indicator in alignment with the cross hair, or other stationary index, whereupon the scale, or scales, on the indicator member will correctly give the position of the sending members at the sending station that is determined by the level of the liquid in the tank at said sending station, which is at that time connected with the receiving station.

It is another important purpose of our invention to provide means for transferring an indication, or reading, from a sending station to a receiving station by means of a plurality of members, which provide readings on a plurality of scales on the indicating member at the receiving station, the sending means being geared to each other so that one of said sending means will make a predetermined definite number of revolutions about the axis of the sending apparatus for a predetermined angular movement of another sending member about said axis. Thus where it is desired to indicate the depth of a liquid in a tank, for example, the indicating member can be provided with a scale representing inches and divisions of inches, the entire distance around the scale representing one foot, and another scale being provided, which is calibrated in feet, and the sending means would be so constructed that the one arm, or member that assumes the various angular positions at the sending station, will make a complete rotation for an angular movement of the other such sending member through an angle that represents a movement corresponding to one calibration on the foot portion of the dial at the receiving station.

In the particular application of the invention which is disclosed herein, means is also provided for adjusting the tape, or other driving member for moving the rotatable parts that move said arms to the various angular positions so that any variation in the length thereof can be adjusted for, and the sending means can be adjusted so that it will send an impulse to the indicating station, or receiving station, that will exactly indicate the position of the float on the liquid in the tank, said means comprising a member for varying the distance between the float and the rotatable member that is rotated by said tape to produce the angular movements of the sending members, which cooperate with the rotatable sending means at the sending station.

Said adjusting means for the operating means to transfer movements of the float to the angularly movable sending members, is further provided with means for indicating the adjustment of the tape, or operating member, which is, preferably, calibrated so that said operating member can be adjusted the smallest fraction of an inch that is provided on the scale of the rotatable indicating means at the receiving station, so that said operating means can be adjusted to give a correct reading to the nearest fraction of an inch to which readings are taken by any person who may gauge the tank by ordinary hand methods without said gauger having any particular knowledge of the electrical, or mechanical apparatus utilized for picking up the reading of the position of the float in the tank and transmitting it to the receiving station. Thus no skilled mechanic, or engineer, or expert, is necessary for making this adjustment and the remainder of the sending mechanism can be enclosed so that the same cannot be tampered with by any one except a person skilled and trained in the adjustment thereof.

It is one of the important purposes of the invention to provide stroboscopic means for indicating the position of any member, such as an indicator, pointer, or arm, or of means operating such a member, such as a float, or other movable means, to produce an indication on a dial at a point remote from the point where the measurement, or angular position of the part, or parts, is to be obtained, which is relatively simple, and which does not require expert operation to adjust either the sending or receiving apparatus after it has once been installed, the adjustment being possible by simple means, the operation of which can be readily taught to anyone, whereupon the reading of the estimate can be obtained in the same manner as any dial would be read.

Other objects and advantages of our invention will appear as the description of the drawings proceeds. We desire to have it understood, however, that we do not intend to limit ourselves to the particular details shown or described, except as defined in the claims.

In the drawings:

Fig. 1 is a view in side elevation and partly diagrammatic showing our complete apparatus for indicating a reading at a point distant from the taking thereof.

Fig. 2 is a view in side elevation on a somewhat larger scale of the sending apparatus located at the point where the reading is to be taken, portions thereof being broken away.

Fig. 3 is a section taken on the line 3—3 of Fig. 2.

Fig. 4 is a fragmentary inside face view of the rotatable sending member.

Fig. 5 is a fragmentary side elevational view thereof.

Fig. 6 is a fragmentary end elevation of the sending apparatus as viewed from the outside thereof at the end opposite the rotatable sending member.

Fig. 7 is a fragmentary elevational view taken substantially on the line 7—7 of Fig. 6.

Fig. 12 is a fragmentary top plan view of the cooperating sending members.

Fig. 13 is a fragmentary longitudinal horizontal sectional view through the motor shaft at the sending station, and parts carried thereby.

Fig. 14 is a fragmentary longitudinal sectional view through the sending apparatus at the main shaft thereof.

Fig. 15 is a similar view of the sending apparatus, at the countershaft.

Fig. 16 is a similar view of the sending apparatus taken at the reel mounting.

Fig. 17 is a fragmentary sectional view through the tape adjusting means.

Fig. 18 is a fragmentary section taken on the line 18—18 of Fig. 9.

Fig. 19 is a fragmentary sectional view through the indicating disk means.

Fig. 20 is a fragmentary elevation of an oil tank showing the manner of connecting our sending mechanism therewith, and Fig. 21 is a circuit diagram showing the electric circuit relationship of the various parts to each other.

Figure 9:
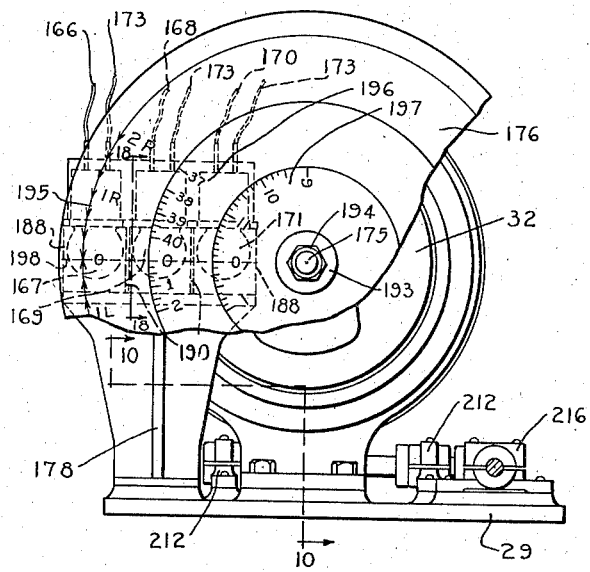
Fig. 9 is a front elevational view of the rotatable indicator and means for rotating the same, the rotatable indicator being partly broken away.
Figure 11:
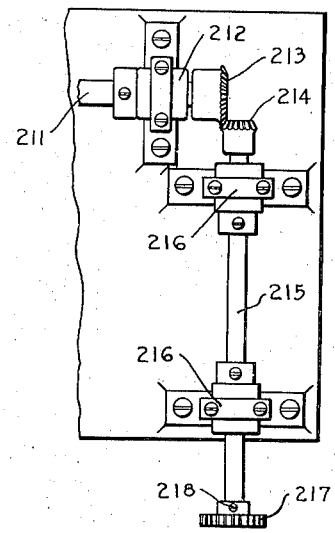
Fig. 11 is a fragmentary top plan view of the driving means for rotating the rotatable indicating member.

Referring in detail to the drawings, in Fig. 1 is shown a source of alternating current comprising the grounded conductor 21 and the so-called "hot" wire 22, these conductors being shown as entering a switch 23 by means of which the same can be connected with corresponding conductors 24 and 25. The conductor 24 is grounded on a frame member 64 constituting part of the frame of apparatus located at a sending station, and with a metallic base 27, upon which is mounted apparatus at said sending station, by means of a conductor 28, and with a metallic base 29, upon which is mounted apparatus at a receiving station, by means of a conductor 30. Also said grounded conductor is connected with a motor 31 at the sending station and a motor 32 at the receiving station by means of the conductors 33 and 34, respectively. The other conductor 25 of the circuit is connected with the motor 31 by means of a conductor 35 and with the motor 32 by means of a conductor 36 through a make and break switch 37 of the type commonly known as a "jog" switch.

The motors 31 and 32 would be normally started at the same instant and be accelerated in the same manner to reach full speed in the same period of time, if operating under the same conditions, when the switch 23 is closed, if these motors are made substantial duplicates, that is, if the same are of the same size, have the rotors thereof wound similarly and the stators thereof constructed in the same way, with the same number of pairs of poles in each motor and with the spacing of the poles the same, the motors 31 and 32 being, preferably, such duplicates in construction and of the type known as alternating current synchronous induction motors.

The motor 31, referring to Fig. 2, is utilized for driving a shaft 38, (see Figs. 2 and 5), which has fixed thereto to rotate in unison therewith, a disk 39, which serves as a rotatable sending member rotating at substantially a uniform speed. The disk-like member 39 is shown more in detail in Figs. 4 and 5, and is provided with a plurality of contact members 40, 41 and 42, which are arranged radially of the disk-like member 39, being narrow in a circumferential direction and being spaced varying distances outwardly from the center of rotation of the disk 39 in a radial direction. The disk-like member 39 is provided with a hub portion 43 and a sleeve 44, which is also fixed to the shaft 38 so as to rotate in unison with said shaft and with the disk-like member 39, is arranged in contacting relation with the end of the hub 43 on the disk 39. A conductor 45 extends from the contact 40 in a suitable groove in the disk 39, said disk 39 being made of insulating material, as is also the sleeve 44, through suitable grooves in the hub 43 and the sleeve 44 to a collector ring 46. The conductor 47 extends from the contact 41 in a similar manner to the collector ring 48, while the conductor 49 extends from the contact 42 to the collector ring 50. Thus the collector rings 46, 48 and 50 are connected, respectively, electrically with the contacts 40, 41 and 42, said collector rings being fixed in position on the insulation rings 26 and held in spaced insulated relation to each other by means of the spacing sleeves 44' of insulating material, (see Fig. 13). Brushes 51, 52 and 53 are provided, the brush 51 engaging with the collector ring 46, the brush 52 with the collector ring 48 and the brush 53 with the collector ring 50. The conductors 54, 55 and 56 extend, respectively, from the brushes 51, 52 and 53 to the receiving station, (see Fig. 1).

A metal collar 115 is secured to the shaft 38 by means of a set screw and the hub 43 of the disk is also fixed to said shaft, the members 44, 44' and 26 and the contact rings 46, 48 and 50 and the insulating ring 116 being clamped in position between said hub 43 and said collar 115, so that all said parts rotate in unison with the shaft 38. The brushes 51, 52 and 53 are slidably mounted in a block 117 of insulating material for guided movement in the openings 118, being yieldingly held in engagement with the collector rings by the coil compression springs 119, the spring pressure of which is adjustable by means of the plugs 120 which screw-threadedly engage said openings 118 and are provided with binding nuts for connecting the conductors 54, 55 and 56 therewith.

Suitable cooperating contact members are provided for engagement with the contact members 40, 41 and 42 to send impulses over circuits of which the conductors 54, 55 and 56 are a part whenever said contacts 40, 41 and 42 on said rotatable sending member 39, in the course of their rotation about the axis of the member 39, engage with said cooperating contact members.

Referring to Fig. 2 it will be noted that the metallic base member 27, which is connected with the grounded conductor 24 and further with a ground connection 57 extending from said conductor 24 (see Fig. 1), to any suitable ground, has mounted thereon a framework comprising a plurality of plates 58, 59, 60 and 61, said plates being secured together by means of rod-like members 62, which are provided with spacing sleeves 63, 64 and 65 thereon, which are of varying lengths to space said plate-like members desired distances from each other, and which are further provided with the nuts 66 engaging the screw threaded ends of the members 62 to clamp said plate-like members and sleeves in assembled relation to form a framework for said sending mechanism mounted on the base 27, said plate-like members being provided with ears 67 thereon, through which securing means 68 extend to secure said framework to said base.

The plate-like member 61 is provided with a fixed arm, or projection, 69, which carries a contact spring 70, which is adapted to engage with the contact 40 each time that the disk-like member 39 makes a rotation and said contacts 40 and 70 come into alignment. A pair of movable arms is also provided carrying contacts cooperating with contacts on the disk-like mamber 39, said contacts being also spring contacts similar to the contacts 70, and being designated by the numbers 71 and 72, the contact 71, cooperating with the contact 41, and the contact 72 with the contact 42. The condact 72 is carried by an arm 73, which is rotatable about the axis of the shaft 74, which aligns with the shaft 38 axially, and the contact arm 75 is mounted for similar rotation about the axis of the shaft 74 and carries the contact 72. Means is provided for moving said contact arms 73 and 75 to various angular positions relative to each other and to the fixed contact carrying member 69 about the axis of the shaft 74.

In the embodiment of the invention shown, this means comprises a member, that is actuated by the liquid level in a tank, such as a float, which is of the usual type and is not shown in the drawings, said float having a tape or other flexible member attached thereto, and being provided with counterbalancing means for moving said tape in accordance with the movements of said float. It will be obvious as the description proceeds that said arms 73 and 75 can be moved to various positions that these assume by any other means for driving the same, or can be moved to suitable positions by manually operated means to produce an indication at the receiving station in accordance with the position to which said arms are moved.

In the embodiment shown, however, the tape 76 is utilized for this purpose, said tape being connected by a flexible member 225 with the float 226 and passing over suitable guiding means in the elbows 227 and through other suitable means at 228 to prevent the passage of explosive gases to the sending mechanism from the tank, particularly if the float operating the tape 76 is located in an oil tank and the sending mechanism is located in a housing 229 and the tape and the flexible connecting means leading to the float are located in tubular guide members 230, as shown in Fig. 20. Said tape 76 passes over a drive wheel 77 to a reel 78, which is rotatably mounted on brackets 79 provided on the plates 58 and 59, by means of a shaft 80, which also carries a smaller drum 81 mounted to rotate in unison with the drum 78, and which has a tape 82 wound thereon carrying the counterweight 83. The shaft 80, (see Fig. 16), is mounted for rotation in the ears 79 by means of ball bearings 121, having the outer ball races 122 mounted in fixed position in said ears 79 having the inner ball races 123 secured on the shaft 80 by means of the nuts 84 engaging the screw-threaded ends of said shaft. Sleeves 85 and 85' are provided for spacing the reels 81 and 78 from the ears 79. Said sleeves 85 and 85' and said reels 81 and 78 are clamped tightly between said ball races 123, when the nuts 84 are tightened up on the shaft 80, so as to be rotatable thereon as a unit.

The drive wheel 77 is provided with side flanges 86 and with a face 87 between said flanges 86, from which pins 88 project at regularly spaced intervals. In the form of the invention shown, the projections, or pins, 88 on the cylindrical face 87 of the drive wheel 77 are spaced exactly an inch apart and the tape 76 is provided with openings 89, which are spaced at intervals of an inch from each other along the entire length of said tape 76 so that said projections 88 will enter the openings 89 in the tape 76, the drive wheel 77 thus being positively geared to the tape 76 in a similar manner to that of a sprocket wheel to a sprocket chain. Accordingly every movement of the tape 76 will be transmitted to the drive wheel 77, the openings exactly receiving the pins so that there will be no lost motion between said tape and said wheel.

The wheel 77 is mounted in fixed position on the shaft 74 so as to rotate therewith. The hub 90 on the arm 75 is fixed on the shaft 74 by means of the pin 125 (see Fig. 14) to rotate in unison therewith. Thus the arm 75 will make one rotation for each rotation of the drive wheel 77 and said drive wheel 77 is, in the form of the invention shown, made with twelve projections thereon located an inch apart, thus making one rotation for each foot of movement of the tape 76. The hub portion 91 of the arm 73 is, however, rotatably mounted on the shaft 74 and said hub extends through a large opening in the plate 61 so as to be free to rotate therein. A gear 92 is fixed on the hub 91 by means of the screw-threaded fastenings 126 and said gear meshes with a gear 93, which is provided on a counter-shaft 94, rotatable in ball bearings 95, the outer ball races of which are fixed in the plates 61 and 59. The shaft 94 has the sleeves 127, 128 and 129 provided thereon, the sleeve 128 extending through an opening in the plate 60, which is larger than said sleeve. A gear 96 is also fixed on the shaft 94 and meshes with a gear 97, which is fixed on the shaft 74 to rotate therewith. The nuts 130 engaging the screw-threaded ends of the shaft 94, clamp the gears 93 and 96 and the spacing sleeves 127, 128 and 129 between the inner ball races of the ball bearings 95, so that said shaft, gears and sleeves rotate as a unit. Thus the shaft 74 drives the gear 97, and in turn, the gears 96, 93 and 92 rotating the arm 73 with the gear 92 in the same direction as the arm 75, but at a much slower speed, the rate of rotation being dependent upon the scale that is to be used on the indicating member and, of course, upon the number of teeth in the gears 97, 96, 93 and 92, which are selected to obtain the desired rotation of the arm 73 to conform with a scale on the indicating member at the receiving station in a manner to be described below.

Inasmuch as the tape 76 is rather long and variations in length thereof may occur due to temperature and other conditions, and the float may float at slightly different levels, dependent upon the liquid in which it is floating, means is provided for adjusting the tape 76 so that the driving wheel 77 will be moved in a manner to exactly indicate the level of said liquid. The fixed contact member 70 represents the zero point, or the point at which the float attached to the tape 76 is at its lowermost position. The arm 75 and the arm 73 will be in radial alignment with the fixed contact carrying member 69 at a time when the float is in its lowermost position, or when the tank is empty, if the parts are in proper adjustment. In a similar manner the arm 73 and the arm 75 will assume an angular position relative to the member 69 about the axis of the shaft 74 for any position of the float 50, dependent upon the distance that the float is from the bottom of the tank. The indicating means at the receiving station will indicate this point on the scale, or scales, provided on said indicating means in a manner which will be described below. While the indicating instrument is showing such a reading, the tank can be gauged by the usual gauging means to determine the depth of liquid therein and a check made. If the indicating means does not properly indicate the measurement obtained by the manual gauging means, the adjusting means to be described below can be utilized to adjust the tape 76 to vary the portion thereof extending between the float and the driving member 77 to get a reading on the indicating instrument corresponding, to the nearest fraction of an inch calibrated thereon, with the measurement obtained by the manual gauging means.

The adjusting means for adjusting the tape to accomplish this comprises a pair of crank arms 99, which are mounted on a shaft 100 to rotate therewith, which shaft is rotatably mounted in the plates 58 and 59, said cranks terminating in bearing members 101 for a rotatable shaft 102, upon which the pulley 103 is mounted, over which the tape 73 passes before it reaches the driving wheel 77. It will be obvious that the nearer the pulley 103 is to the wheel 77 the less length there will be between the float and the driving wheel 77, and the further said pulley is from the wheel 77, the greater the length of the tape between the driving wheel and the float will be. The cranks 99 are provided with hub portions 104 mounted on the shaft 100 and an operating arm 105 is provided, which has a hub portion 106 that is secured in fixed position on the shaft 100 so that said arm 105 will move in unison with the crank arms 99. The operating arm 105 is located outside the cover plate 107 of the sending apparatus, and said cover plate is provided with a plate 108 on the outside thereof, fixed in position thereon, which is provided with a series of indentations, or recesses, 109, which are arranged at regularly spaced intervals, each space between such recesses representing one of the fractional portions of an inch that constitute the smallest divisions that constitute the scale on the indicating instrument. Thus if the scale on the indicating instrument indicates one-eighth of an inch as the smallest measurement that is readable thereon, the recesses 109 are spaced such a distance apart that a movement of the arm 105 from one thereof to the next thereof will move the pulley 103 such a distance that a correction in the reading at the receiving station of one-eighth of an inch will be made by such movement. In order to hold the adjusting arm 105 in adjusted position, a spring projected pin 110 is provided, which is adapted to engage in the recesses 109, said pin extending through an opening in the arm 105 and having an enlarged shank portion 111 terminating in a head 112, with which shank portion the forked end of a spring 113 fixed to the arm 105 is connected, the spring 113 tending to move the pin 110 into its cooperating recess 109 and the head 112 being utilized to move said pin out of said recess against the action of the spring 113 when it is desired to adjust the arm 105 to a different position.

Upon reference to Figs. 2 and 14 it will be noted that the shaft 74 is screw-threaded at one end thereof, as indicated at 131, and a nut 132 engages with the screw-threaded end of the shaft 74. A sleeve 133 having a flange 98 thereon is mounted on the shaft 74, the pin 125 holding said sleeve in fixed position on said shaft. Said sleeve has the hub portion 90 of the arm 75 secured thereto adjacent the flange 98 and also mounted on said sleeve is the hub portion 91 of the arm 73, a bushing 134 being provided in said hub portion 91 to provide a good bearing on said member 91 for rotation on the sleeve 133. A washer 135 is received between the hub portion 91 and the hub portion 90. The sleeve 133 is of such a length that it extends slightly beyond the gear 92, the end thereof engaging with a washer 136, which engages with the inner ball race of the ball bearing 137, the outer ball race of which is fixed in the wall 60. A sleeve 138 has the end thereof engaging with the opposite face of the inner ball race referred to and a contact disk 139 is mounted between the sleeve 138 and the sleeve 140, which sleeve 140 is in engagement with one side of the gear 97, a sleeve 141 engaging with the other side of the gear 97 and with the inner ball race of a ball bearing 142, the outer ball race of which is fixed in the plate 59. A sleeve 143 is mounted between the opposite face of the inner ball race of the ball bearing 142 and the hub of the drive wheel 77, and a sleeve 144 is mounted between said hub of said drive wheel 77 and the inner race of the ball bearing 145, the outer race of which is fixed in the wall 58. It will be seen that when the nut 132 is tightened down on the shaft 74 it will clamp the sleeves 138, 140, 141, 143 and 144, the gear 97, the contact wheel 139 and the drive wheel 77, as well as the inner ball races of the ball bearing members 137, 142 and 145 in fixed position on the shaft 74 so that all these parts will rotate in unison in the ball bearings referred to. Of course, due to the provision of the washer 135 and the sleeve 133 of such a length that it will extend endwise beyond the gear 92, the gear 92 and the hub 91 of the arm 73 will rotate freely on the shaft 74 except as restrained by the gearing made up of gears 97, 96, 93 and 92.

The conductor 54 has the primary winding 146 of a transformer connected therewith, said transformer having a secondary winding 147 and a conductor 148 extending from the opposite end of said primary winding 146 to one set of plates of a condenser 149, the other set of plates of the condenser being connected with a conductor 150, which is connected with a conductor 151 leading to the one pole of a battery 152, a high resistance 153 being connected across the condenser 149 to connect the conductors 148 and 150. In a similar manner the conductor 55 is connected with the primary 154 of a transformer having the secondary winding 155, and having the conductor 156 leading from the opposite end of said primary winding to the condenser 157, from which condenser the conductor 158 leads to the conductor 151 connecting with said pole of the battery 152, and the conductor 56 is similarly connected with the primary winding 159 of a transformer having the secondary winding 160 and having a conductor 161 leading to the condenser 162, a conductor 163 leading from said condenser to the conductor 151 connecting with said pole of the battery 152. High resistances 164 and 165 are provided bridging the condensers 157 and 162.

The secondary winding 147 has one terminal thereof connected with a conductor 166, which leads to a neon lamp 167, the corresponding terminal of the secondary 155 has a conductor 168 extending therefrom to the neon lamp 169 and the secondary winding 160 has a conductor 170 extending from the corresponding end thereof to the neon lamp 171. A common lead conductor 172 is connected with the opposite terminals of the windings 147, 155 and 160, said conductor 172 being connected with each of the neon lamps by means of a conductor 173.

Upon reference to Figs. 1, 2 and 9 it will be seen that when the contacts 40 and 70 are out of engagement, the circuit will be open between one set of plates of the condenser 149 and the ground. While this open circuit condition exists, the condenser 149 will be discharged through the resistance 153 bridged across said condenser. Thus there will be no charge on the plates of the condenser 153 just prior to the closing of the circuit by engagement of the contacts 40 and 70. In a similar manner there will be no charge on the plates of the condenser 157 just prior to the time that the contacts 41 and 71 come into engagement, and there will be no charge on the plates of the condenser 162 just prior to the engagement of the contacts 42 and 72. When the contact is made between the cooperating contacting members 40 and 70 a circuit will be completed from the one set of plates of the condenser 149 through the winding 146, the conductor 54, the contacts 40 and 70, the frame of the sending machine and the conductor 24 to the ground 57, and the other set of plates of the condenser 149 will be connected with the ground through the battery 152 and the switch 174. This will result in a charge being built up on the plates of the condenser at the instant said contacts engage, causing a surge of current through the winding 146, which will induce a surge of current in the secondary 147 energizing the neon lamp 167 to momentarily flash illuminate the same. It will be obvious that such a flash will occur each time that the contact 40 first engages with the contact 70 upon each revolution of the disk 39 and thus flashes of the lamp 167 will occur simultaneously with the making of the circuit through the contacts 40 and 70. In a similar manner the lamp 169 will be flashed simultaneously with the making of the circuit by engagement of the contacts 41 and 71 and the neon lamp 171 will be flash illuminated simultaneously with the engagement of the contacts 42 and 72 to close the circuit between these contacts. Each of these circuits is opened substantially immediately after having been closed, but this will have no effect on the charge on the plates of the condenser and there will be no surge of current in a reverse direction through the windings 146, 154 and 159 when the circuits are broken due to disengagement of the contacts 40 and 70, 41 and 71 and 42 and 72, respectively. These circuits will remain open for substantially a rotation of the rotatable member at the sending station and during this open circuit condition the condensers will gradually be discharged through the windings bridged across the same in such a manner that no surge of current will occur that will affect the flash illuminating means.

It will be obvious that the interval between the flash of the flash illuminating member 167 and that of the flash illuminating member 169 and the interval between the flash of the flash illuminating member 167 and that of the flash illuminating member 171 will depend upon the position of the arms 73 and 75 relative to the fixed contact carrying member 69. It will also be obvious that if means is provided rotating at the same speed as the rotatable disk 39 that is illuminated successively by the illuminating devices 167, 169 and 171 and means is provided for indicating the portion of the rotating member that is opposite the illuminating means at the time of such illumination, the relative angular position of the arms 73 and 75 to each other and to the fixed contact carrying member 69 can be read on said rotating member due to the stroboscopic effect produced by said rotating member and said flash illuminating means. More correctly, it should be stated that the angular position of the rear edges of the contacts 70, 71 and 72, which are first engaged by the leading edges of the contacts 40, 41 and 42 can be exactly determined in this manner, and scales, or other indicia, can be provided on the rotating member associated with the flash illuminating means to give a reading corresponding to said contacts on said arms and on said fixed contact carrying member. However, in order to avoid any necessity of calculation, it is desirable to establish a zero point from which all the scales are to be read, and this zero point is established by means of the flash produced by the illuminating means 167 and determined by the position of the contact carried by the member 69. While various rotatable means can be provided, it has been found particularly desirable to provide a rotatable means that is of a disk-like character and transparent, or translucent, so that the light from the illuminating means 167, 169 and 171 is transmitted therethrough. Also it will be evident that various circuits may be utilized for transmitting the position of the contacts, or other members, carried by the arms 71 and 73 and the fixed member 69 to the illuminating means to cause the same to be flashed in accordance with the position of said members 69, 71 and 73.

Figure 8:
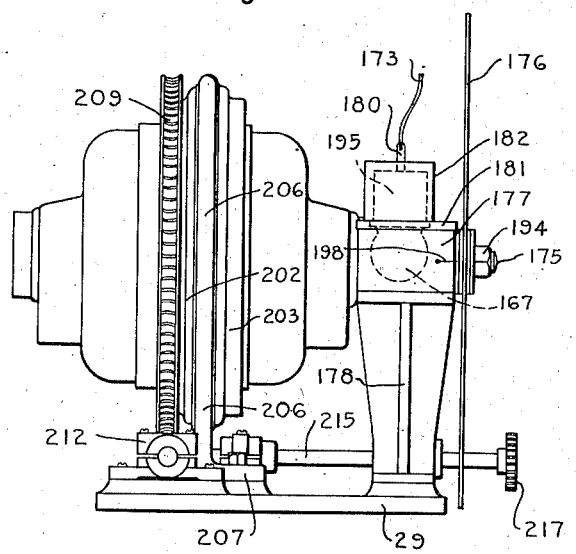
Fig. 8 is a side elevational view of the receiving means at the point where the indicator is located.
Figure 10:
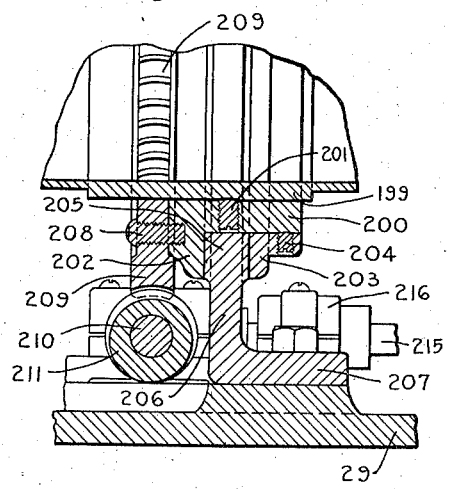
Fig. 10 is a fragmentary view on an enlarged scale partly in elevation and partly in section, the section being taken substantially on the line 10—10 of Fig. 9.

Referring to Fig. 1 it will be seen that the motor 32, which is of the same type and size and constructed to be a substantial duplicate of the motor 31, will rotate at the same speed as the motor 31 and said motor is provided with a shaft 175, which carries the indicating disk 176, the flash illuminating means being located in a casing 177 adjacent the disk 176, the casing being mounted on a bracket 178 supported on the base 29. Referring to Figs. 8, 9 and 18 it will be seen that the flash illuminating members, such as the member 169 shown in Fig. 18, is mounted in an insulating base 179, which is provided with the usual lamp socket from which the terminals 180 extend that are connected with the conductors leading to the secondary winding of the transformer, with which said flash illuminating means 169 is connected. The casing 177 is provided with a top wall 181 having openings therein through which the base portions 179 extend, and has flanges 182 and 183 extending upwardly therefrom to form an open topped box-like portion in which said base members 179 are located, a plastic insulating material 184 being poured into the space between the metallic walls 182 and 183 and the base member 179 and contacts 180 to hold the base member in position and insulate the contacts 180 from each other and from the wall portions referred to. The top wall 181 of the casing is removable and thus forms a cover on the casing, which is provided with flanges 185 and 186 fitting around the rear wall 187 and the end walls 188 of the casing 179. Partitions 190 are also provided in said casing, which are fixed in position and divide the casing into three box-like chambers, each housing one of the illuminating means 167, 169 or 171, as the case may be, and defining a limited area of illumination produced by said flash illuminating means on the disk-like indicting member 176.

The disk-like indicating member 176 is mounted on the shaft 175 to rotate therewith, said disk-like member 176 having a plurality of perforations 191 therein, in which the rubber, or other yieldable, disks 192 will seat when the disk 176 is clamped in position on the shaft, metal washers 193 being provided between the yieldable disk-like washers 192 and the nuts 194, which are utilized for clamping the disk in fixed position on the shaft 175, the shaft being threaded to receive the nuts 194, the nut 194 nearest the motor being first adjusted to its proper position, whereupon the disk-like members 192, 191 and 176 are inserted in proper position and the nut 194 on the outside thereof tightened up to exactly locate the position of the disk 176 in such position relative to the box-like housing 179 that the illuminating means within the same will sufficiently illuminate the scales on the disk that the markings are clearly defined and can be readily determined.

In the form of the invention shown, the disk-like member is provided with three concentrically arranged annular scales, the outer scale being designated by the numeral 195, the intermediate scale by the numeral 196 and the innermost scale by the numeral 197. The scales are provided in any desired manner on the disk-like member, depending upon what the character of the material of the disk-like member may be, being either etched, printed, or otherwise provided thereon. However, the scales are all arranged in fixed position to each other and with the calibrations thereon dependent upon the character of reading that it is desired to obtain. The outer scale 195 is utilized to obtain the proper zero point for the reading of the other scales 196 and 197. The scale 197, in the particular form of the invention illustrated, is calibrated in eighths of inches so as to indicate a movement of one foot of the member that drives the drive wheel 77 for the complete distance around said scale. The scale 196 is calibrated proportionately to the scale 197 to indicate a movement of the member moving the drive wheel 77 a distance of one-quarter of a foot for each calibration thereon, the entire scale indicating a movement of forty feet, for the member driving the member 77, from the zero point of said scale to the highest point of said scale, it being, of course, understood that the indication on the scale 196 is determined by the position of the arm 73 and that the position of said arm is determined by the gearing provided for driving the same and this gearing must produce such a relative rotation of the arm 73 to the arm 75 that each rotation of the arm 75 will produce an angular movement of the arm 73 corresponding to the angle between adjacent foot marks on the scale 196.

A stationary indicating member, such as the cross hair, or cross wire, 198 is provided on the casing 179 extending radially from the axis of the shaft 175 to the outer wall 188 so as to define a radial line across the path of rotation of the disk 176. It will be obvious that when the zero point of the scale 195 is illuminated by the flash of the illuminating means 167 at the exact time that it is in alignment with the cross hair, or cross wire, 198 the zero points on the other scales will also be in alignment therewith, and will be simultaneously illuminated, provided the arms 73 and 75 are in such position relative to the fixed member 69 that the contacts carried by said arms are all in radial alignment relative to the axis of the shaft 74. Also in any position of said arms the flashing of the illuminating means 169 and 171 will illuminate such portions of the scales 197 and 196 momentarily as are in alignment with the box-like enclosures in which said illuminating means are located and a certain indication on said scales will be in alignment with the cross hair, or cross wire, 198 at such time as this takes place and the particular calibration, or index, on the scale that is in alignment with said member 198 at the time of said flash will be indicating the position of the contacts on the arms 73 and 75, and thus the position of the member operating the drive wheel 77, thus providing means for determining the position of the float in the tank, or the liquid level in the tank, or the position of any other member operating the driving member 77 on the scale shown, or any other appropriate scale for indicating such position of the means that operates the driving member 77.

However, it is necessary to first establish the correst zero point for the scale 195 in order to have the readings on the other scales 196 and 197 correct. Due to variations in relative speed of the motors 31 and 32, due to outside influences, such as variations in temperature, and so on, and due to the fact that the exact setting of the disk on the shaft 175 to cause the zero on the scale 195 to be in alignment with the stationary index 198, at the exact instant that the contact 40 will engage with the contact 70 fixed on the member 69, is difficult, means is provided for adjusting the apparatus to get the correct starting point, or zero position for the disk 176 at the exact instant of flash of the illuminating means 167. Also due to the fact that it is sometimes difficult to start two synchronous alternating current induction motors so that the same will be rotating in exact synchronism, that is, with the corresponding parts of the two rotors of the two motors in exactly the same position relative to the stators at exactly the same instant during the rotation thereof, where motors are provided that have a plurality of pairs of poles, it is necessary to provide means for bringing the two motors exactly in step, not only as to their speed of rotation, but as to their exact correspondence in rotation. By exact correspondence in rotation is meant that the portion of the rotor that is in radial alignment with the zero point on the scales of the disk, and on the same side of the axis as said zero point, is in this position at the same time that that portion of the rotor of the motor 31 that is in radial alignment and on the same side of the axis of rotation of said rotor as the contacts 40, 41 and 42, is in radial alignment, and on the same side of the axis of rotation of the motor 31, as the fixed contact carried by the member 69.

In multi polar alternating current synchronous induction motors having a plurality of pairs of poles, although two motors, such as the motors 31 and 32, may be exactly alike in construction, these will not always stay in such correspondence as referred to, because the poles provided on the stator are not opposite the same portions of the rotor in both motors and one motor may start a definite fraction of a turn behind or in front of the other motor, dependent upon the number of pairs of poles that the motors have. This can be corrected by instantaneously interrupting the circuit to and then re-establishing the circuit to one of said motors by means of a "jog" switch without interfering with the flow of current to the other motor. This will cause a temporary slowing down of the rotor such that when the current is again flowing through the motor the relationship of the rotor and stator will have been altered and this can be repeated until the proper position of the parts of the two motors is obtained to make the exact correspondence referred to. The exact correspondence will be indicated on the scale 195 as the zero point on the scale will appear in alignment with the cross hair 198 when such correspondence is obtained. The scale is provided with suitable markings of any desired character to indicate the angular distance that the rotating disk is from the position at which it indicates the correct zero point. The jog switch is indicated at 37 in Fig. 1 and any suitable spring actuated snap action switch which can be operated, preferably, by a push button, or similar member, for breaking the circuit and immediately remaking it, may be utilized.

The means for correcting the position of the rotating assembly at the receiving station comprising the indicating member and the rotor of the motor, comprises means for turning the stator of the motor about the axis of rotation of the shaft 175 so as to shift the poles of said stator circumferentially until the rotation of the rotor and the disk is brought into such correspondence with the rotation of the disk-like member 39 that the zero indication on the scale 195 will be in exact alignment with the stationary indicating member 198 when the flashes of the illuminating means 167 occur.

Referring to Figs. 8 to 11, inclusive, it will be seen that the stator 199 of the motor 32 has an annular guide ring 200 secured thereto, said annular guide ring being fixed to the stator in any desired manner, as by means of the set screws 201. Said annular guide ring is provided with an annular flange 202, which is fixed on the ring 200, and a detachable annular flange member 203, which is angular in cross section and is secured in position on the member 200 by set screws 204. The flanges 202 and 203 define a groove between the same, in which is mounted the end portion 205 of a guide ring 206, which is provided with a base flange 207, by means of which the same is secured to the base member 29. The faces of the ring 206 at the inner periphery 205 thereof, are finished to have a sliding fit in the groove provided between the outer peripheral face of the member 200 and the flanges 202 and 203. Secured in fixed position on the member 202 by means of the screw-threaded fastening members 208 is a ring gear 209, which is made in the form of a worm wheel, which engages with a worm 210, said worm 210 being mounted in fixed position on a shaft 211, which is mounted in suitable bearings on the base member 29, one of said bearings being indicated at 212.

Keyed on the shaft 211 is a bevel gear 213, which meshes with the bevel gear 214 keyed on the shaft 215, which is connected in suitable bearings 216 on the base 29, said shaft 215 being provided with a suitable knurled, or otherwise roughened, hand wheel 217 for rotating the same, which is fixed thereto by means of a set screw 218. It will be obvious that the worm 210 can be rotated in either direction by means of the hand wheel 217 to turn the stator 199 slowly on its axis, it being, of course, to be understood that the ring gear 209 is arranged concentrically to the shaft 175. It will be obvious that as the stator is moved, the alternations of the current supplied to the motors 31 and 32 will cause the rotor to move either slightly forward or backward in its rotation relative to the rotation of the rotor of the motor 31 and cause the disk 176 to be brought into exact correspondence with the disk 39 during its rotation so that the zero point on the scale 195 will be in coincidence with the cross hair 198 at the same instant that the flash illuminating means 167 will be illuminating due to making of contacts between the contacts 40 and 70, and that if the two motors are rotating at the same speed this zero will be maintained as long as the adjustment of the member 217 is not altered. The markings on the scale 195 are, preferably, so made as to indicate whether the member 217 has to be moved to the left or to the right to bring the stator into such position as to establish the desired zero point.

It has also been found that in case the motor 31 and the motor 32 are not rotating at the same speed, the zero point will tend to gradually get out of step with the flashes so that the scale 195 will appear to be gradually creeping around as the same is illuminated. If the difference in speed between the two motors is only very slight, which is usually the case where a difference in temperature exists in the location of the two motors, this gradual apparent shifting of the scale relative to the cross hair will be relatively slow, and not only will determine whether the motors are not rotating at the same speed, but whether the speed of rotation of the two motors is too far apart to give a close enough reading for practical purposes of the scales on the indicating member. If the shifting of the zero point is very slow, or is only moderately slow, it has been found that the hand wheel 217 can be manipulated to bring the zero point on the scale 195 momentarily into proper alignment with the stationary index 198, and if the readings on the scales 196 and 197 are taken at the same moment that this zero is obtained, in this manner, the reading of the scales 196 and 197 will be so nearly correct that there will not be an error, as great as the smallest calibration of the scale 197, in taking the reading in this manner. This is very desirable, particularly where readings are to be taken rapidly, because it is sometimes impossible under such circumstances to wait for the two motors to get to exactly the same speed.

If desired, in order to obtain a more reliable contact between the frame and the rotating arms 73 and 75, the contact disk 139 can be utilized, said contact disk 139 cooperating with any suitable brush 219 provided on a bracket 220 on the frame to assure a continuous connection between the shaft 98 and the parts carried thereby and said frame, eliminating any possibility of sparking in the bearings, or at any other parts where intermittent contacts might possibly occur in the rotating mechanism of the sending station. If it is desired to replace any of the illuminating members on the box-like member 179, all that is necessary is to remove the removable cover member 181 without in any manner disturbing the wiring leading to the contacts 180 and unscrew the bulb that has ceased to function, replacing it with a new one.

What we claim is:

1. Stroboscopic indicating apparatus of the character described comprising a rotatable indicator, means for rotating the same at a predetermined speed, a plurality of flash illuminating means mounted to each illuminate a limited area of a different annular zone on said indicator, said areas being radially aligned, a fixed index extending across said zones, rotatable means remote from said illuminating means to independently flash the same so as to flash one thereof in accordance with the position of a fixed point representing a zero or starting point for a movable operating member and another thereof in accordance with the position of said movable operating member, means for rotating said rotatable means at substantially the same speed as said indicator, and concentric scales on said indicator each aligning with one of said zones to be each illuminated by one of said flash means, the scale aligning with said flash illuminating means which is flashed in accordance with the position of said fixed point having means thereon for indicating and establishing a zero point for all said scales, and the scale aligning with said illuminating means flashed in accordance with the position of said movable operating member having means thereon for indicating a reading in accordance with the position of said movable operating member.

2. Indicating apparatus of the character described comprising rotatable means at a sending station, indicating means comprising rotatable means at a receiving station, means for rotating said rotatable means at substantially the same speed, comprising an alternating current synchronous induction motor at the sending station, an alternating current synchronous induction motor at the receiving station that is a substantial duplicate of the motor at the sending station, and means for adjusting the motor at the receiving station to bring the rotation of said rotatable means at the receiving station into correspondence with the rotation of said rotatable sending means, comprising means for shifting the stator of the motor at said receiving station on its axis while the rotor of the same is rotating in said stator and means for instantaneously interrupting and re-closing the circuit of the motor at said receiving station without interrupting the circuit of the motor at said sending station.

3. Straboscopic indicating apparatus of the character described comprising a rotatable indicator, means for rotating the same at a predetermined speed, a plurality of flash illuminating means mounted to each illuminate a restricted area of a different annular portion of said indicator while the same is rotating said areas being in radial alignment, said indicating apparatus having concentric scales each on one of said annular portions of said indicator and aligning with and each illuminated by one of said flash means, movable operating member and rotatable means remote from said illuminating means having means to independently flash the same so as to flash illuminate one thereof to illuminate a limited area of one of said scales in accordance with the position of a fixed point representing a starting or zero point for said movable operating member, the scale aligning with said one flash illuminating means having means thereon for indicating and establishing a zero point for all said scales, and to flash illuminate another thereof to illuminate a limited area of another of said scales in accordance with the position of said movable operating member, the scale aligning with said last mentioned illuminating means having means thereon for indicating a reading in accordance with the position of said movable operating member, a stationary index extending radially of said indicator and cooperating with both said scales and means for rotating said rotatable means at substantially the same speed as said rotatable indicator.

4. In an apparatus of the character described, a rotatable disk-like transparent dial, means for rotating the same, a plurality of concentric scales arranged annularly on said dial, a plurality of flash illuminating devices on one side of said dial, adjacent radially aligned housings for said illuminating devices confining the illumination from each thereof to a limited zone on each of said scales, and a fixed index extending across said zones radially of said dial.

5. Apparatus of the character described, comprising a fixed member, a plurality of members movable about an axis into various angular positions relative to said fixed member and to each other, and stroboscopic means for indicating the position of said fixed member and of said movable members relative to said fixed member, comprising a rotatably mounted member adjacent said plurality of members and said fixed member, a plurality of members mounted in fixed position on said rotatably mounted member to rotate therewith, one thereof being mounted to move into juxtaposition with said fixed member once during each rotation of the rotatably mounted member and the others thereof being mounted to each move into juxtaposition with one of said movable members once during each rotation of said rotatably mounted member, a rotatable indicator, means for rotating said rotatable indicator and said rotatably mounted member at substantially the same uniform speed, a stationary index cooperating with said rotatable indicator, flash illuminating members mounted relative to said rotatable indicator so as to each illuminate a zone thereof at a different spacing from the rotational center of the indicator, means flashing one of said illuminating members whenever the member on said rotatably mounted member cooperating therewith moves through its juxtaposed position to said fixed member, means flashing each another of said illuminating members whenever the members cooperating therewith move through their juxtaposed positions to said movable members, said means each comprising an electrical circuit including one of said illuminating members affected to energize its illuminating member whenever the respective members on said rotatable member move through their juxtaposed positions to said movable and fixed members, a plurality of scales on said indicator, a said stationary index simultaneously cooperating with all the scales on said indicator, each in one of said illuminated zones, to simultaneously indicate the position of all said members on said indicator by the flashing of said illuminating members, and means for adjusting the rotation of said indicator to synchronize the coincidence of said stationary index and a point on one of said scales with the passing of the member on said rotatable member through the juxtaposed position to said fixed member.

6. Apparatus of the character described, comprising a fixed member, a plurality of members movable about an axis into various angular positions relative to said fixed member and to each other, and stroboscopic means for indicating the position of said fixed member and of said movable members relative to said fixed member, comprising a rotatably mounted member adjacent said plurality of members and said fixed member, a plurality of members mounted in fixed position in radial alignment on said rotatably mounted member to rotate therewith, one thereof being mounted to move into juxtaposition with said fixed member once during each rotation of the rotatably mounted member and the others thereof being mounted to each move into juxtaposition with one of said movable members once during each rotation of said rotatably mounted member, a rotatable indicator, means for rotating said rotatable indicator and said rotatably mounted member at substantially the same uniform speed, a stationary index cooperating with said rotatable indicator, flash illuminating members mounted relative to said rotatable indicator so as to illuminate radially aligned limited concentric zones of said indicator, means flashing one of said illuminating members whenever the member on said rotatably mounted member cooperating therewith moves through its juxtaposed position to said fixed member, means flashing each another of said illuminating members whenever the members cooperating therewith move through their juxtaposed positions to said movable members, said means each comprising an electrical circuit including one of said illuminating members affected to energize its illuminating member whenever the respective members on said rotatable member move through their juxtaposed positions to said movable and fixed members, a plurality of scales on said indicator, said stationary index extending radially across said zones to simultaneously cooperate with all the scales on said indicator, each in one of said illuminated zones, to simultaneously indicate the position of all said members on said indicator by the flashing of said illuminating members, and means for adjusting the rotation of said indicator to synchronize the coincidence of said stationary index and a point on one of said scales with the passing of the member on said rotatable member through the juxtaposed position to said fixed member.

7. Apparatus of the character described, comprising a fixed member, a plurality of members movable about an axis into various angular positions relative to said fixed member and to each other, means for moving said members relatively in accordance with a predetermined law, said fixed and movable members being each spaced a different radial distance from said axis, and stroboscopic means for indicating the position of said fixed member and of said movable members relative to said fixed member, comprising a member rotatably mounted about said axis adjacent said plurality of members and said fixed member, a plurality of members mounted in radially aligned fixed position on said rotatably mounted member to rotate therewith, each thereof being spaced a different radial distance from the axis of rotation of said rotatably mounted member corresponding to the distances of said fixed and movable members from said axis, a rotatable indicator, means for rotating said rotatable indicator and said rotatably mounted member at substantially the same uniform speed, flash illuminating members mounted to each illuminate a zone of said indicator at a different spacing from the rotational center thereof comprising electrical circuits each, including one of said illuminating members, affected to energize its illuminating member whenever the respective members on said rotatable member move into cooperative relation with said fixed and movable members, a plurality of scales on said indicator comprising scales having the same relationship to each other as the movements of said movable members, a stationary index extending radially of said indicator and simultaneously cooperating with all the scales on said indicator, each in one of the illuminating zones, to simultaneously indicate the position of all said members on said indicator by the flashing of said illuminating members, and means for adjusting the rotation of said indicator to synchronize the coincidence of said stationary index and a point on one of said scales with the passing of the member on said rotatable member through the cooperating position to said fixed member.

8. Apparatus of the character described, comprising a fixed member, a plurality of members movable in accordance with a predetermined law, about an axis, in concentric paths radially spaced from each other and from said fixed member, and stroboscopic means for indicating the positions of said fixed member and movable members relative to said fixed member, comprising a plurality of substantially aligned, radially spaced members mounted to rotate in unison about said axis, said substantially aligned members comprising a member mounted to move in a path to cooperate with said fixed member and members mounted to move in paths to cooperate with one of said movable members, a rotatable indicator having a plurality of concentric radially spaced scales thereon, alternating current induction motors for rotating said indicator and said members mounted to rotate in unison at substantially the same uniform speed, a stationary index extending radially of said indicator and cooperating simultaneously with all said scales, flash illuminating members having means for directing the illumination thereof to each illuminate a different radially spaced zone of said indicator aligning each with one of said scales, said zones being radially aligned with each other and traversed by said index, and means for flashing said illuminating means, by the cooperation of the respective members mounted to rotate in unison with said fixed members and members movable in accordance with said law to simultaneously indicate the position of all said members, and means for adjusting the rotation of said indicator relative to the rotation of said members rotating in unison to synchronize the coincidence of said stationary index and the zero points of all said scales with the movement of the one rotatable member through its cooperating position to said fixed member.

9. Apparatus of the character described, comprising a fixed member, a plurality of members movable in accordance with a predetermined law, about an axis, in concentric paths radially spaced from each other and from said fixed member, and stroboscopic means for indicating the positions of said fixed member and movable members relative to said fixed member, comprising a plurality of substantially aligned, radially spaced members mounted to rotate in unison about said axis, said substantially aligned members comprising a member mounted to move in a path to cooperate with said fixed member and members mounted to move in paths to cooperate with one of said movable members, a rotatable indicator having a plurality of concentric radially spaced scales thereon, alternating current induction motors for rotating said indicator and said members mounted to rotate in unison at substantially the same uniform speed, a stationary index extending radially of said indicator and cooperating simultaneously with all said scales, flash illuminating members having means for directing the illumination thereof to each illuminate a different radially spaced zone of said indicator aligning each with one of said scales, said zones being radially aligned with each other and traversed by said index, and means for flashing said illuminating means, by the cooperation of the respective members mounted to rotate in unison with said fixed members and members movable in accordance with said law to simultaneously indicate the position of all said members, and means for adjusting the rotation of said indicator relative to the rotation of said members rotating in unison to synchronize the coincidence of said stationary index and the zero points of all said scales with the movement of the one rotatable member through its cooperating position to said fixed member comprising means for shifting the stator of the motor rotating said indicator, and means for opening and instantaneously reclosing the operating circuit of said motor, to bring the poles of both motors in correspondence with each other.

10. Apparatus of the character described, comprising a fixed member, a plurality of members movable, in accordance with a predetermined law, about an axis in concentric paths radially spaced from each other and from said fixed member, and stroboscopic means for indicating the positions of said fixed member and movable members relative to said fixed member, comprising a plurality of substantially aligned, radially spaced members mounted to rotate in unison about said axis, said substantially aligned members comprising a member mounted to move through a position in juxtaposition to said fixed member once during each rotation thereof and members mounted to move each through a position in juxtaposition to one of said movable members once during each rotation thereof, a rotatable indicator having a plurality of concentric radially spaced scales thereon, alternating current induction motors for rotating said indicator and said members mounted to rotate in unison at substantially the same uniform speed, a stationary index extending radially of said indicator and across all said scales to cooperate simultaneously with all thereof, flash illuminating members having means for directing the illumination thereof to each illuminate a different radially spaced zone of said indicator aligning each with one of said scales, said zones being aligned with each other and traversed by said index, and means for flashing said illuminating means, comprising electrical circuits controlling the transmission of electrical energy to said flash illuminating means, said circuits including said members mounted to rotate in unison, and being controlled by the position of said members and the members cooperating therewith to illuminate one of said flash illuminating members whenever a member mounted to rotate in unison moves through its juxtaposed position relative to its cooperating member, whereby said scales simultaneously indicate the position of all said members, and means for adjusting the rotation of said indicator relative to the rotation of said members rotating in unison to synchronize the coincidence of said stationary index and the zero points of all said scales with the movement of one rotatable member through its juxtaposed position to said fixed member, comprising means for opening and instantaneously reclosing the operating circuit of the motor rotating said indicator to bring the poles of both motors into correspondence with each other, and means for manually adjusting the stator of said motor.

11. Apparatus of the character described, comprising a fixed member, a plurality of members movable about an axis into angular positions relative to said fixed member, all said members being each spaced a different radial distance from said axis, and stroboscopic means for transmitting the positions of said fixed and movable members, comprising a plurality of members mounted for rotation in unison adjacent said fixed and movable members about said axis, said rotatably mounted members being each mounted at a different radial distance from said axis corresponding to the distances of said fixed and movable members therefrom and being radially aligned.

CHARLES E. MAIN.
LEONARD HANSON.